(12) United States Patent
Takeuchi

(10) Patent No.: US 8,891,826 B2
(45) Date of Patent: Nov. 18, 2014

(54) IMAGE PROCESSING SYSTEM, IMAGE PROCESSING METHOD, AND COMPUTER PROGRAM

(75) Inventor: Hideto Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/608,887

(22) Filed: Sep. 10, 2012

(65) Prior Publication Data

US 2013/0004023 A1    Jan. 3, 2013

Related U.S. Application Data

(63) Continuation of application No. 12/434,784, filed on May 4, 2009, now Pat. No. 8,280,108.

(30) Foreign Application Priority Data

Jun. 24, 2008   (JP) .................. 2008-164856

(51) Int. Cl.
*G06K 9/00* (2006.01)
*G08B 13/196* (2006.01)
*G06T 7/20* (2006.01)

(52) U.S. Cl.
CPC ......... *G06T 7/20* (2013.01); *G06T 2207/30232* (2013.01); *G06T 2207/30196* (2013.01); *G08B 13/19671* (2013.01)
USPC ....................................... 382/103

(58) Field of Classification Search
USPC ............... 382/103, 191; 348/143; 370/352
See application file for complete search history.

(56) References Cited

U.S. PATENT DOCUMENTS

| 6,754,367 B1 * | 6/2004 | Ito et al. ................. 382/103 |
| 2006/0193534 A1 * | 8/2006 | Hirose .................... 382/291 |
| 2008/0002857 A1 * | 1/2008 | Tsunashima ............. 382/103 |

FOREIGN PATENT DOCUMENTS

| JP | 62-86990 | 4/1987 |
| JP | 2-61793 | 3/1990 |
| JP | 09-050585 | * 2/1997 |
| JP | 9-50585 | 2/1997 |
| JP | 2002-352340 | 12/2002 |
| JP | 2004-222200 | 8/2004 |
| JP | 2006-107457 | 4/2006 |

* cited by examiner

*Primary Examiner* — Amara Abdi
(74) *Attorney, Agent, or Firm* — Oblon, Spivak, McClelland, Maier & Neustadt, L.L.P.

(57) ABSTRACT

An image processing system includes: an object detecting unit that detects a moving body object from image data of an image of a predetermined area; an object-occurrence-position detecting unit that detects an occurrence position of the object detected by the object detecting unit; and a valid-object determining unit that determines that the object detected by the object detecting unit is a valid object when the object is present in a mask area set as a non-detection target in the image of the predetermined area and the occurrence position of the object in the mask area detected by the object-occurrence-position detecting unit is outside the mask area.

19 Claims, 14 Drawing Sheets

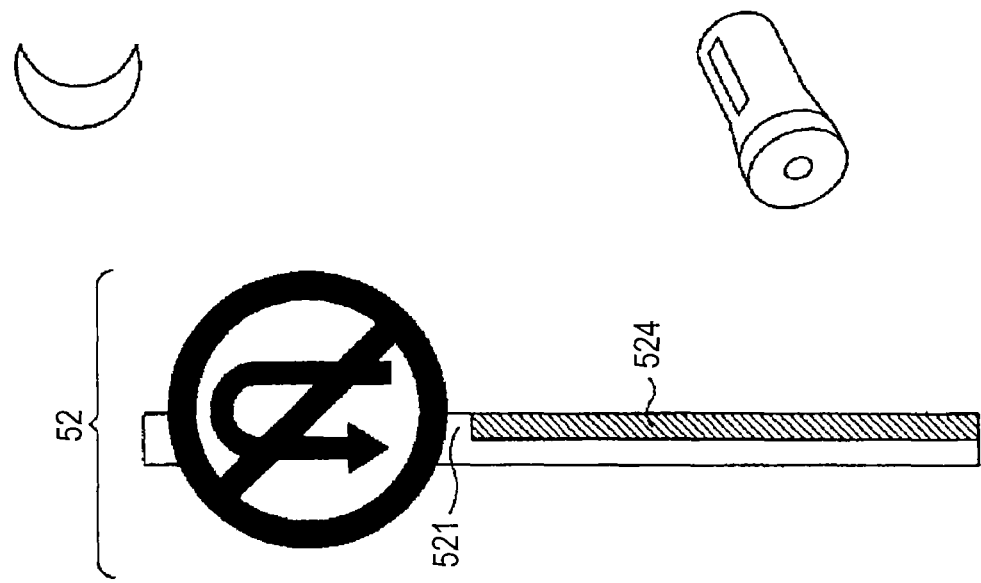
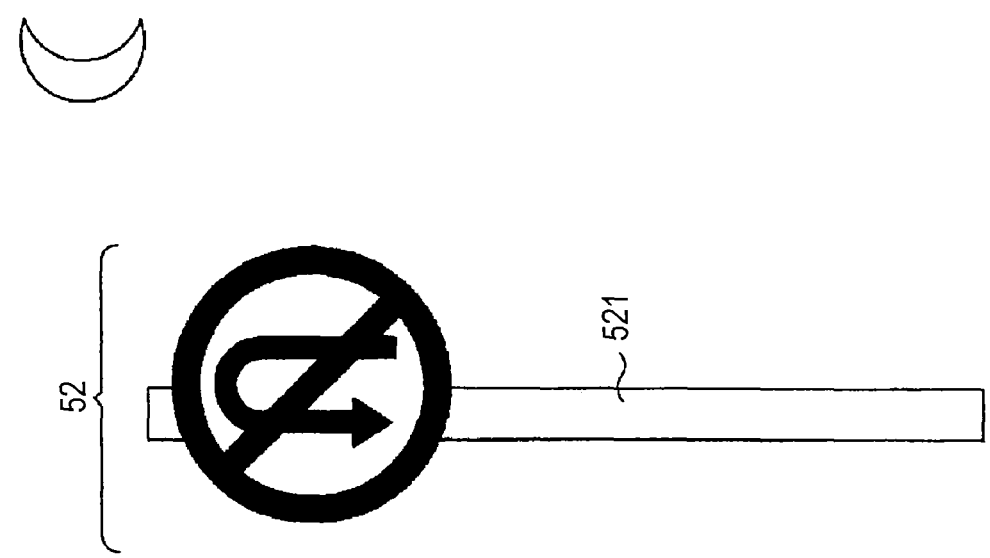

IMAGE PROCESSING SYSTEM, IMAGE PROCESSING METHOD, AND COMPUTER PROGRAM

CROSS-REFERENCE TO RELATED APPLICATIONS

This application is a continuation application of, and claims the benefit of priority under 35 U.S.C. §120 from, U.S. application Ser. No. 12/434,784, filed May 4, 2009, which claims the benefit of priority under 35 U.S.C. §119 from Japanese Patent Application No. 2008-164856, filed Jun. 24, 2008. The entire contents of each of the above applications are incorporated herein by reference.

BACKGROUND OF THE INVENTION

1. Field of the Invention

The present invention relates to an image processing system, an image processing method, and a computer program for analyzing an input image and outputting a monitoring result.

2. Description of the Related Art

There is an image processing system that analyzes an image obtained by photographing a predetermined area with a monitoring camera and detects a moving body such as a person or a car to thereby perform monitoring (hereinafter referred to as monitoring system).

FIG. 9 is a diagram of a state of moving body detection in such a monitoring system. A monitoring camera (not shown) photographs, from the front, a person 51 as a moving body and a sign 52 as a background object located behind the person 51. The person 51 is captured in a moving body detection frame 53 as an object to be monitored. In such moving body detection processing, it is possible to apply an algorithm for calculating temporal changes in pixel values in an image and, when a difference among the pixel values is equal to or larger than a predetermined value, determining that a moving body is present in the image (see JP-A-2006-107457).

As shown in FIG. 9, the person 51 as the object is passing in front of the sign 52. No temporal change occurs in the sign 52 because the sign 52 is stationary. Only the person 51 is captured in the moving body detection frame 53 and detected by the monitoring camera.

In this example, a moving body is not limited to the person 51 and may be, for example, a car or a bicycle. The background object 52 may be, for example, a house or a tree.

As shown in FIG. 10, when the sunlight is irradiated on a pole 521 of the sign 52, the sunlight is reflected on an area 522 on the surface of the pole 521 and causes a large luminance change. The same phenomenon occurs if a background object is an object having a surface that, like the sign 52, causes reflection of light such as a wall surface of a warehouse made of metal or a curbstone. Although the sign 52 is not moving, a luminance change in the sign 52 is large. Therefore, such light reflection is misdetected as an object via the monitoring camera in the moving body detection algorithm.

FIG. 11 is a diagram of a state in which the person 51 passes a sunlight-irradiated side of the sign 52. As shown in FIG. 11, when the sunlight is blocked by the person 51, a shadow 523 is formed in a part of the area 522 on the surface of the pole 521. In this case, the luminance on the surface of the pole 521 substantially changes. Although the person 51 is not passing between the monitoring camera and the sign 52, a luminance change is large on the person 51. Therefore, such a shadow is misdetected as an object via the monitoring camera in the moving body detection algorithm.

Such misdetection may occur at night. Normally, as shown in FIG. 12A, light is not emitted from the surface of the pole 521 of the sign 52 at night. However, as shown in FIG. 12B, when some light such as light of a car is irradiated on the pole 521, the light is reflected on, for example, an area 524 on the surface of the pole 521 to generate reflected light. In such a case, as in the case explained above, although a moving body such as the person 51 is not passing between the monitoring camera and the sign 52, a luminance change is large. Therefore, the reflected light is misdetected as an object via the monitoring camera in the moving body detection algorithm.

Therefore, in the moving body detection algorithm in the past, for example, as shown in FIG. 13, processing for setting a mask area 54 in a position of the pole 521 of the sign 52 as a non-detection area to not perform image processing in the mask area 54 is performed. This makes it possible to prevent misdetection on the surface of the pole 521.

Another related art includes Japanese Patent No. 3997062.

SUMMARY OF THE INVENTION

However, when such processing for setting a mask area is performed, for example, as shown in FIG. 14, the person 51 is not detected in the mask area 54 and is only detected outside the non-detection area as indicated by the moving body detection frame 53.

Therefore, it is desirable to provide an image processing system, an image processing method, and a computer program that can accurately detect a moving body object in an image in which a mask area is set.

According to an embodiment of the present invention, there is provided an image processing system including: an object detecting unit that detects a moving body object from image data of an image of a predetermined area; an object-occurrence-position detecting unit that detects an occurrence position of the object detected by the object detecting unit; and a valid-object determining unit that determines that the object detected by the object detecting unit is a valid object when the object is present in a mask area set as a non-detection target in the image of the predetermined area and the occurrence position of the object in the mask area detected by the object-occurrence-position detecting unit is outside the mask area.

According to another embodiment of the present invention, there is provided an image processing method including the steps of: detecting a moving body object from image data of an image of a predetermined area; detecting an occurrence position of the object detected in the detecting an object; and determining that the object detected in the detecting an object is a valid object when the object is present in a mask area set as a non-detection target in the image of the predetermined area and the occurrence position of the object in the mask area detected in the detecting an occurrence position is outside the mask area.

According to still another embodiment of the present invention, there is provided a computer program for causing a computer to execute the steps of: detecting a moving body object from image data of an image of a predetermined area; detecting an occurrence position of the object detected in the detecting an object; and determining that the object detected in the detecting an object is a valid object when the object is present in a mask area set as a non-detection target in the image of the predetermined area and the occurrence position of the object in the mask area detected in the detecting an occurrence position is outside the mask area.

According to the present invention, even in the outdoors where an environmental change tends to occur, when an intruder or the like is monitored by using a monitoring camera, it is possible to accurately detect a moving body object and reduce misreporting of an alert.

BRIEF DESCRIPTION OF THE DRAWINGS

FIGS. 12A and 12B are diagrams for explaining misdetection of an object at night;

DESCRIPTION OF THE PREFERRED EMBODIMENTS

An embodiment of the present invention is explained in detail below with reference to the accompanying drawings.

Figure 1:
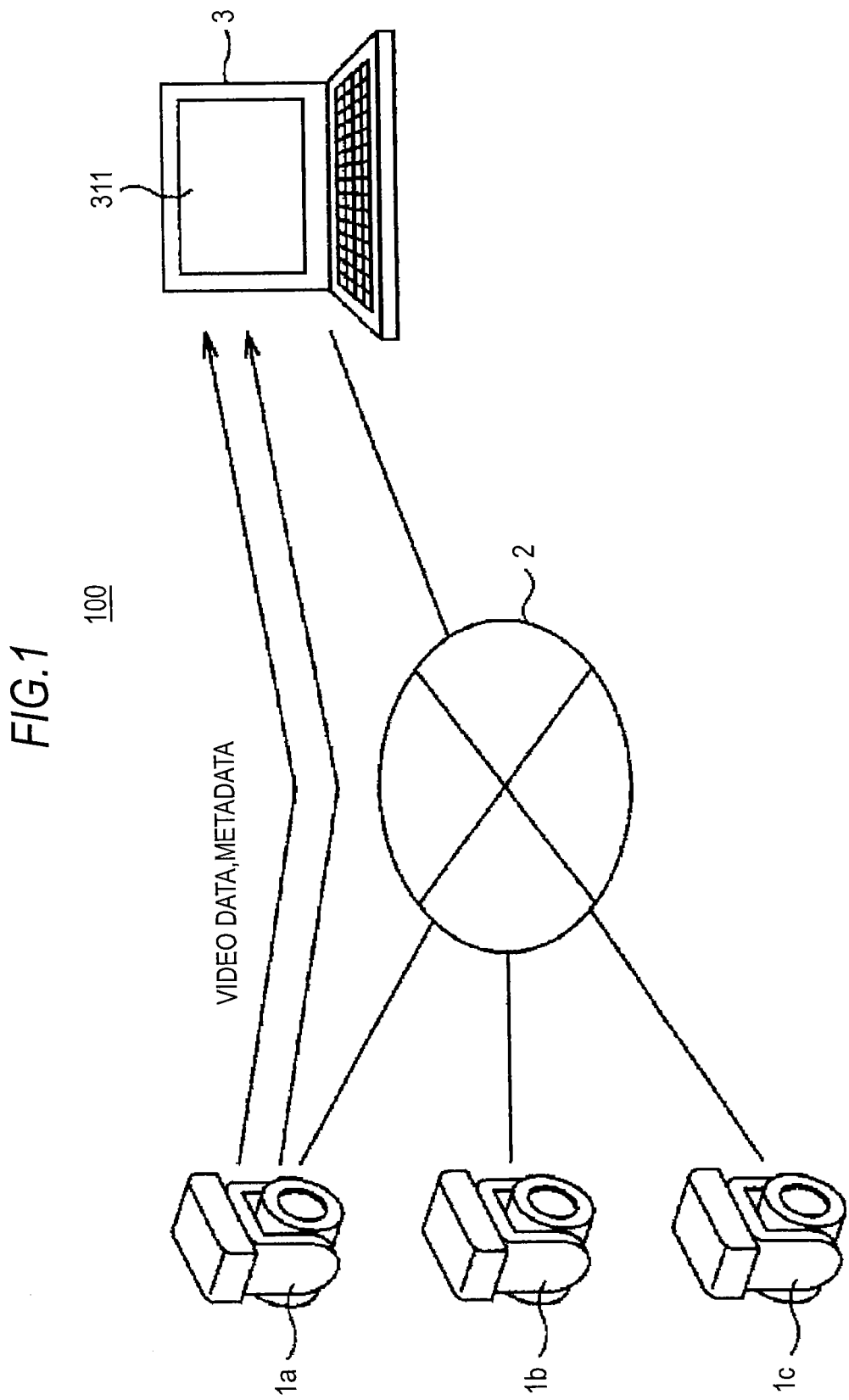
FIG. 1 is a diagram of a configuration example of a monitoring system according to an embodiment of the present invention.

FIG. 1 is a diagram of a configuration example of a monitoring system according to an embodiment of the present invention. In a monitoring system 100 shown in FIG. 1, a client terminal 3 acquires, via a network, data output from one or plural monitoring cameras.

In the monitoring system 100, three monitoring cameras 1a, 1b, and 1c are connected to the client terminal 3 via a network 2. The client terminal 3 may be any information processing apparatus including a display unit such as a personal computer as shown in FIG. 1.

The monitoring cameras 1a, 1b, and 1c respectively photograph, in frame units, a monitoring target moving body in monitoring areas to generate image data and generate metadata from the image data of each frame. In this embodiment, examples of a monitoring target object include various moving bodies such as a person, a car, a bicycle, and an animal.

When the client terminal 3 acquires the image data and the metadata from the monitoring cameras 1a, 1b, and 1c via the network 2, the client terminal 3 displays an image based on the image data on a display unit 311. The client terminal 3 causes a storing unit (not shown) to store the image data and the metadata, analyzes the metadata, and outputs a result of the analysis.

The metadata acquired by the client terminal 3 from the monitoring camera 1a, 1b, and 1c via the network 2 is analyzed via a metadata filter (hereinafter referred to as "filter"). Depending on content of a filter processing result, the client terminal 3 supplies a switching instruction signal to the monitoring cameras 1a, 1b, and 1c in order to control the operation of the monitoring cameras 1a, 1b, and 1c from which monitoring images suitable for monitoring are obtained.

Metadata generated in a monitoring camera is explained. The metadata is attribute information of image data of an image picked up by an imaging unit of the monitoring camera. For example, the metadata includes the following:

object information (information such as a position, a motion vector, an ID, a coordinate, and size of an object detected by the monitoring camera);

imaging time data and direction information (pan, tilt, etc.) of the monitoring camera;

position information of the monitoring camera; and signature information of a picked-up image.

The object information is information obtained by expanding information described as binary data in the metadata into meaningful data structure such as a structure.

The metadata filter is a determination condition in generating alert information from object information. The alert information is information subjected to filter processing based on the object information expanded from the metadata. The alert information is obtained by analyzing metadata of plural frames, deducing speed from a change in a position of a moving body, checking whether the moving body crosses a certain line, or analyzing these kinds of information in a compound manner.

As a type of the filter in the client terminal 3, for example, there are seven types explained below. A filter of an arbitrary type among these types can be selected.

Appearance: a filter for determining whether an object is present in a certain area Disappearance: a filter for determining whether an object appears in a certain area and moves out of the area Passing: a filter for determining whether an object crosses a certain boundary Capacity: a filter for counting the number of objects in a certain area and determining whether a cumulative number of objects exceeds a predetermined value Loitering: a filter for determining whether an object stays in a certain area exceeding a predetermined time Unattended: a filter for determining whether an object that intrudes into a certain area and does not move exceeding a predetermined time is present Removed: a filter for detecting that an object present in a certain area is removed Examples of data included in the alert information include "a cumulative number of objects" generated through a filter that uses a cumulative value of detected objects such as "Capacity" or the like among the filter explained above, "the number of objects" as the number of objects matching a condition of a filter, the number of objects matching a condition of a filter in a specific frame, and attribute information of an object matching a condition of a filter (an ID, an X coordinate, a Y coordinate, and the size of the object). In this way, the alert information includes the numbers of objects (the numbers of people) in an image and statistics of the numbers of objects. The alert information can also be used as a report function.

In this embodiment, as explained above, the client terminal 3 generates the alert information on the basis of the metadata transmitted from the monitoring cameras 1a, 1b, and 1c. In recent years, according to conditions such as a reduction in size and power saving of an arithmetic processing device, it is possible to perform, on a camera, processing performed by a client apparatus in the past. It is also possible to generate alert information on the basis of a predetermined condition (a filter) in the monitoring cameras 1a, 1b, and 1c.

Figure 2:
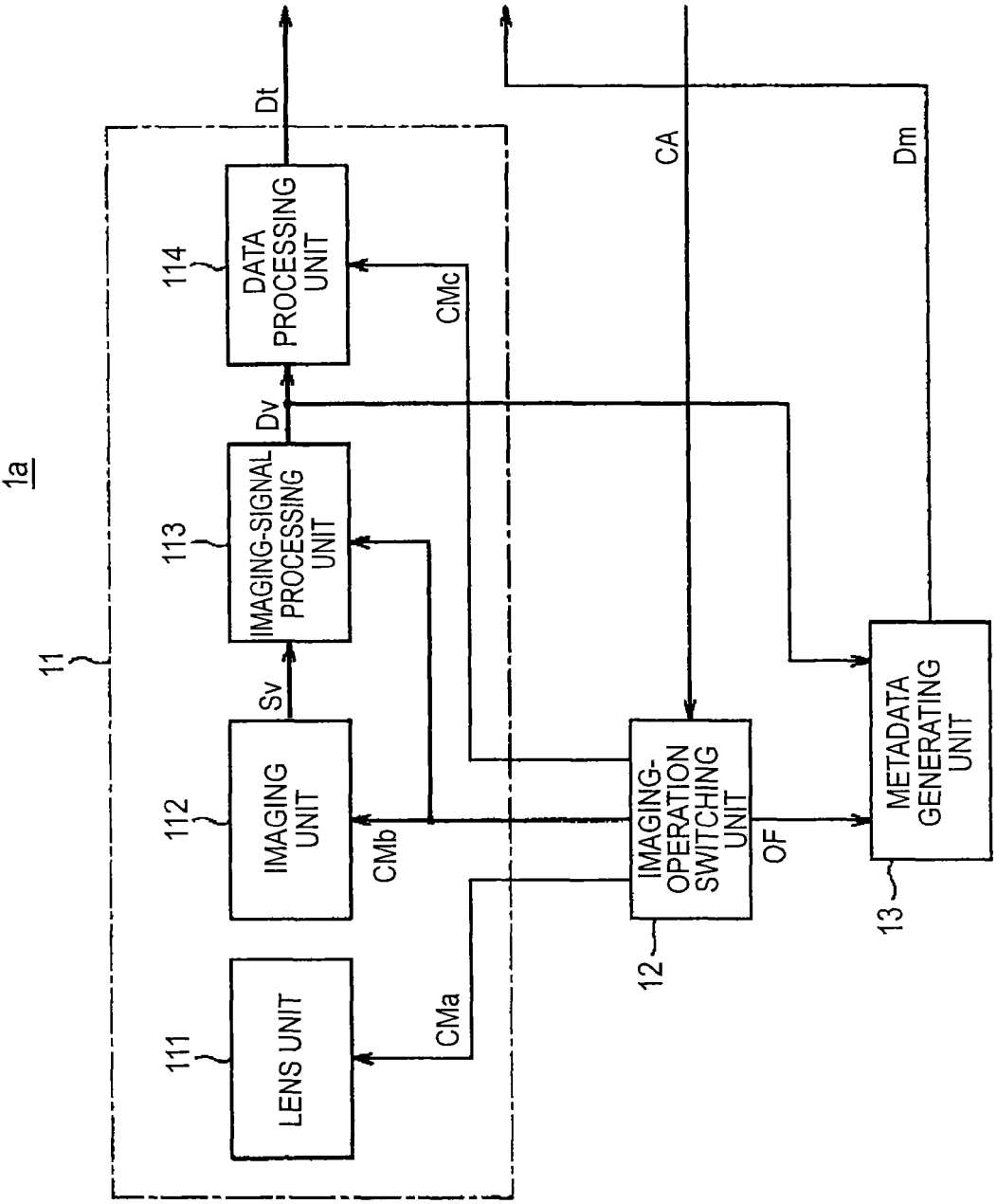
FIG. 2 is a functional block diagram of a configuration of a monitoring camera included in the monitoring system according to the embodiment.

A detailed configuration of the monitoring cameras 1a, 1b, and 1c is explained. FIG. 2 is a functional block diagram of a configuration of the monitoring camera 1a. Since the monitoring cameras 1a, 1b, and 1c have the same configuration, explanation of configurations of the monitoring cameras 1b and 1c is omitted.

The monitoring camera 1a includes an image-data generating unit 11, an imaging-operation switching unit 12, and a metadata generating unit 13.

The image-data generating unit 11 includes a lens unit 111, an imaging unit 112, an imaging-signal processing unit 113, and a data processing unit 114.

The imaging unit 112 performs imaging in frame units through the lens unit 111 and photoelectrically converts imaging light focused on an imaging element (not shown) to generate an imaging signal Sv in frame units.

The imaging unit 112 includes, for example, a preamplifier unit and an A/D (Analog to Digital) converting unit. The preamplifier unit performs amplification of an electric signal level of the imaging signal Sv and removal of reset noise due to correlated double sampling. The A/D converting unit converts the imaging signal Sv from an analog signal into a digital signal.

The imaging unit 112 also performs gain adjustment, stabilization of a black level, adjustment of a dynamic range, and the like for the supplied imaging signal Sv in frame units. Thereafter, the imaging unit 112 supplies the imaging signal Sv to the imaging-signal processing unit 113.

The imaging-signal processing unit 113 applies various kinds of signal processing to the imaging signal Sv supplied from the imaging unit 112 and generates image data Dv. The imaging-signal processing unit 113 performs, for example, knee correction for compressing a level equal to or higher than a certain level of the imaging signal Sv, γ correction for correcting a level of the imaging signal Sv according to a γ curve, and white clip processing an black clip processing for limiting a signal level of the imaging signal Sv to a predetermined range. The imaging-signal processing unit 113 supplies the image data Dv to the data processing unit 114 and the metadata generating unit 13 and causes the storing unit (not shown) to store the image data Dv.

The data processing unit 114 applies encoding processing to the image data Dv in order to reduce a data amount in performing communication with the client terminal 3 and the like and generates image data Dt. The data processing unit 114 supplies the generated image data Dt to the client terminal 3 as predetermined data structure. The monitoring system 100 performs processing for detecting a moving body object. Therefore, an image including the object is more important than other images not including the object. Therefore, in this encoding processing, the data processing unit 114 may increase a compression ratio for the image data Dv of the image including the object and reduce a compression ratio for the image data Dv of the images not including the object. This makes it possible to highly precisely reproduce the image including the object.

The imaging-operation switching unit 12 controls the lens unit 111, the imaging unit 112, the imaging-signal processing unit 113, and the data processing unit 114 on the basis of a switching instruction signal CA input from the client terminal 3 such that an optimum picked-up image can be obtained and performs operation switching for the monitoring camera 1. The imaging-operation switching unit 12 performs, for example, besides performing switching of an imaging direction of the imaging unit, processing for supplying a control signal CMa to the lens unit 111 to cause the lens unit 111 to perform switching of a zoom ratio and an iris, supplying a control signal CMb to the imaging unit 112 and the imaging-signal processing unit 113 to cause the imaging unit 112 and the imaging-signal processing unit 113 to perform switching of a frame rate of the picked-up image, and supplying a control signal CMc to the data processing unit 114 to cause the data processing unit 114 to perform switching of a compression ratio of image data.

The imaging-operation switching unit 12 supplies an imaging operation signal QF (e.g., an imaging direction and a zoom state at the time when the monitoring target object is imaged and setting information of the image-data generating unit 11) to the metadata generating unit 13 and controls the metadata generating unit 13.

The metadata generating unit 13 generates metadata Dm including information concerning the object. As in this embodiment, when the moving body is set as the monitoring target object, the metadata generating unit 13 detects the moving body object using the image data Dt generated by the image-data generating unit 11, generates object detection information indicating whether the object is detected and object position information indicating a position of the detected object, and includes the object detection information and the object position information in the metadata Dm as object information. A unique ID is allocated to the detected object.

Information concerning the monitoring target included in the metadata Dm is not limited to the information related to the object and may be information indicating a state of an area monitored by the monitoring camera, for example, information such as the temperature and the brightness of the monitored area. Alternatively, the information concerning the monitoring target may be information concerning, for example, operation performed in the monitored area. When the temperature is set as a monitoring target, the metadata generating unit 13 only has to include a temperature measurement result in the metadata Dm. When the brightness is set as a monitoring target, the metadata generating unit 13 only has to discriminate, for example, average luminance of a monitoring image on the basis of the image data Dv and include a result of the discrimination in the metadata Dm.

When operation performed by a user on an ATM (Automated Teller Machine), a POS (Point Of Sales), and the like is set as a monitoring target, the metadata generating unit 13 only has to include user operation performed through an operation key, an operation panel, and the like in the metadata Dm.

The metadata generating unit 13 can record and keep time and a situation of generation of the metadata Dm by including the imaging operation signal QF supplied from the imaging-operation switching unit 12 (e.g., an imaging direction and a zoom state at the time when the monitoring target is imaged and setting information of the image-data generating unit 11), time information, and the like in the metadata Dm.

The structure of the image data Dt and the metadata Dm is explained. The image data Dt and the metadata Dm include data main bodies and link information. The data body of the image data Dt is image data of monitoring images photographed by the monitoring cameras 1a and 1b. The data body of the metadata Dm is the description of information and the like indicating the monitoring target object and attribute information defining a description mode for the information. On the other hand, the link information is the description of association information indicating association between the image data Dt and the metadata Dm, attribute information defining a description mode of content of the information, and the like.

As the association information, for example, a time stamp and a sequence number for specifying the image data Dt are used. The time stamp is information indicating generation time of the image data Dt (time information). The sequence number is information indicating generation order of content data (order information). When plural monitoring images having the same time stamp are present, generation order of the image data Dt having the same time stamp can be identified. As the association information, information for specifying an apparatus that generates the image data Dt (e.g., a manufacturing company name, a model name, and a serial number) may be used.

For the description of the link information and the metadata body, a markup language defined for describing information exchanged on the web (WWW: World Wide Web) is used. When the markup language is used, exchange of information via the network 2 can be easily performed. Further, exchange of image data and metadata can also be easily performed by using, as the markup language, for example, the XML (Extensible Markup Language) used for exchange of documents and electronic data. When the XML is used, for example, an XML schemer is used as the attribute information defining the description mode of the information.

The image data Dt and the metadata Dm generated by the monitoring cameras 1a, 1b, and 1c may be supplied to the client terminal 3 as one stream. Alternatively, the image data Dt and the metadata Dm may be supplied to the client terminal 3 asynchronously as separate streams.

In the object detection processing in the past, in order to prevent misdetection in an area of a non-detection target, a mask area is set for the non-detection target and image processing is not performed in the mask area. However, in such object detection processing in the past, a moving body is not detected when the moving body is present in the mask area.

Therefore, the monitoring system 100 according to this embodiment performs object detection processing for detecting an object even when the object intrudes into the mask area.

Figure 3:
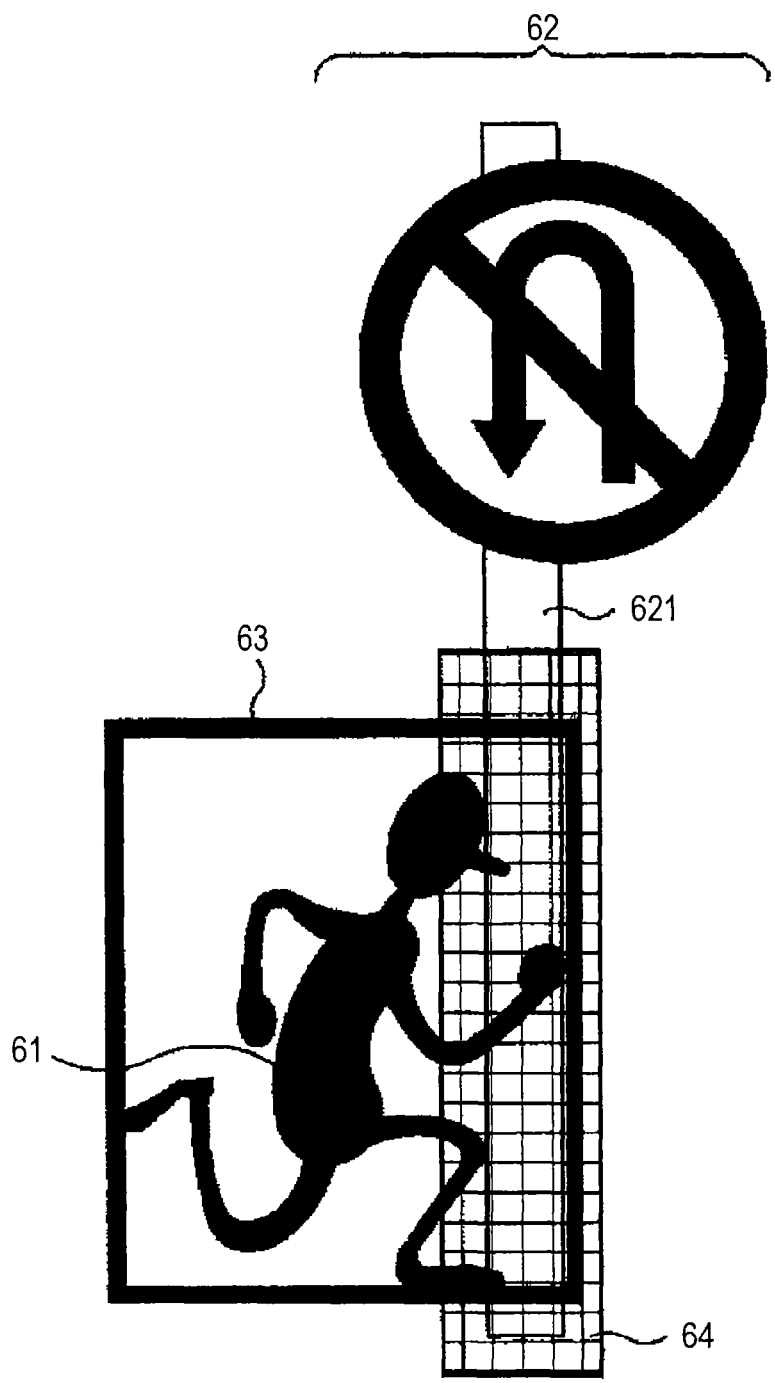
FIG. 3 is a diagram of a state of object detection performed when the monitoring system according to the embodiment sets a mask area in a background object that is a non-detection target.

In this object detection processing, for example, as shown in FIG. 3, when a mask area 64 as a non-detection area is set in a position of a pole 621 of a sign 62, a person 61 as an object is detected in the mask area 64 even when the person 61 intrudes into the mask area 64 from the outside of the mask area 64. The person 61 is captured in a moving body detection frame 63 and detected.

Figure 4:
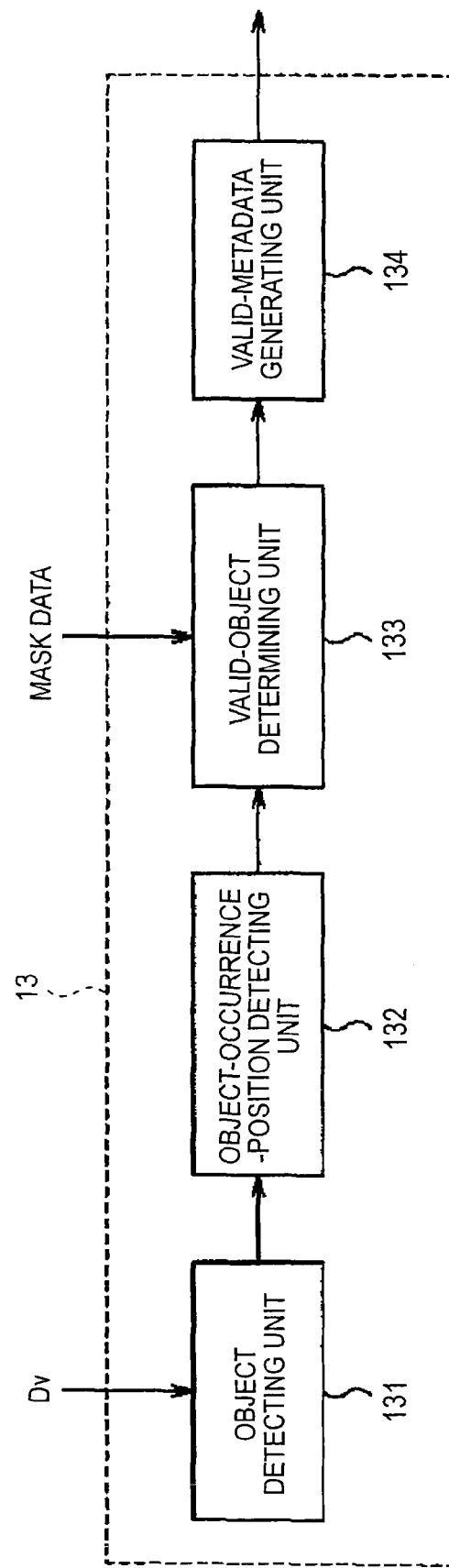
FIG. 4 is a diagram of a configuration of a metadata generating unit.

FIG. 4 is a diagram of a configuration of the metadata generating unit 13. The metadata generating unit 13 includes an object detecting unit 131, an object-occurrence-position detecting unit 132, a valid-object determining unit 133, and a valid-metadata generating unit 134 and performs such moving body detection processing.

The metadata generating unit 13 generates the metadata Dm including information concerning an object. The metadata generating unit 13 detects the moving body object using the image data Dt generated by the image-data generating unit 11, generates object detection information indicating whether the object is detected and occurrence position information indicating an occurrence position of the detected object, and includes the object detection information and the occurrence position information in the metadata Dm as object information. The detected object is allocated with a unique ID and stored in the storing unit (not shown).

In the monitoring system 100, before the metadata generating unit 13 performs the moving body detection processing, the client terminal 3 sets, on the basis of operation of the user, a mask as a non-detection area in a place that is likely to be excluded from object detection processing. A mask setting signal as mask setting information is supplied from the client terminal 3 to the monitoring cameras 1a, 1b, and 1c via the network 2.

The image data Dv of the moving body object such as the person 61 is supplied to the object detecting unit 131 from the imaging-signal processing unit 113. In the imaging system 100, the imaging unit 112 photographs an image for each frame. The imaging-signal processing unit 113 applies image processing to the imaging signal Sv in frame units acquired by the imaging unit 112. The image data Dv for each frame is supplied to the object detecting unit 131. The object detecting unit 131 subjects the image data Dv supplied from the imaging-signal processing unit 113 to image processing and acquires the object. The object detecting unit 131 sets, as the metadata Dm, object detection information indicating whether the object is detected. The object detecting unit 131 allocates a unique ID to the detected object. The object detecting unit 131 includes the object detection information in the metadata Dm as object information and causes the storing unit (not shown) to store the metadata Dm. The object detecting unit 131 transmits the metadata Dm to the client terminal 3.

In the object detection processing performed by the imaging-signal processing unit 113, for example, the moving body detection algorithm disclosed in JP-A-2006-107457 can be applied. In some case, plural images of an object are acquired. In this case, the same algorithm is applied. In the algorithm disclosed in JP-A-2006-107457, a temporal luminance change is detected in an image in frame units and an area in which a change in luminance occurs is set as a moving body object. However, the obtained object also includes a misdetected invalid object. A valid object explained later is an object that is a monitoring target and for which an alert needs to be reported if the object meets a condition of a filter when the object is detected. The invalid object is an object that is not a monitoring target and for which an alert does not need to be reported even if the object is detected. Such an invalid object is removed by processing explained later performed by the valid-object determining unit 133.

The monitoring camera 1a performs processing for tracking the object detected on the basis of the luminance change after the occurrence of the object. This makes it possible to specify a relation between the mask area and an object occurrence position. More specifically, the object-occurrence-position detecting unit 132 specifies, from the image data Dv of all the frames imaged and stored in the storing unit (not shown), an image frame at a point when the object occurs. The object-occurrence-position detecting unit 132 detects an occurrence position of the object from the frame image and generates object occurrence position information. The object-occurrence-position detecting unit 132 includes the object occurrence position information in the metadata Dm as object information and causes the storing unit (not shown) to store the metadata Dm. The object-occurrence-position detecting unit 132 transmits the metadata Dm to the client terminal 3.

As a method of detecting an object occurrence position adopted by the object-occurrence-position detecting unit 132, for example, an object area tracking method disclosed in JP-A-2007-334631 can be applied. With the object area tracking method, even when an object area temporarily disappears because of overlap or hiding, identification information associated with the object area can be maintained and object tracking can be performed with high performance.

When the object is detected because of the luminance change in the mask area, the object-occurrence-position detecting unit 132 may perform processing for calculating a motion vector for an image around the object and calculating a position where the object is present in an image of an immediately preceding frame. In this case, the valid-object determining unit 133 explained later determines, on the basis of the motion vector obtained by the vector calculation processing, that the object present outside the mask area in the image of the immediately preceding frame does not occur in the mask area and is a valid object. When a motion vector is not calculated regardless of the fact that there is a luminance change in the image in the mask area, the valid-object determining unit 133 determines that the detected object is reflected light or a shadow and misdetection occurs.

It is possible to further improve accuracy of object determination by performing these kinds of processing in combination.

The valid-object determining unit 133 determines whether an object present in the mask area among all objects (including an invalid object) already detected by the object detecting unit 131 so far in image data of all the frames occurs in the mask area or occurs outside the mask area. In other words, the valid-object determining unit 133 determines whether an occurrence position of an object present in the mask area detected by the object-occurrence-position detecting unit 132 is inside the mask area.

When the object occurs outside the mask area, the valid-object determining unit 133 determines the object as a valid object. When the object occurs in the mask area, the valid-object determining unit 133 determines the object as an invalid object.

With such processing, the valid-object determining unit 133 can determine whether an object intrudes into the mask area from the outside of the mask area or the object occurs in the mask area. The valid-object determining unit 133 determines that an object that moves only in the mask area is not a valid object. In this determination processing, it is also possible to further set a determination criterion that even an object that occurs in the mask area is a valid object if the object moves out from the mask area.

The valid-metadata generating unit 134 generates the metadata Dm of the moving body that is information indicating that the object is determined as the valid object by the valid-object determining unit 133. The metadata Dm is supplied to the client terminal 3 via the network 2. The client terminal 3 reports this alert according to filter processing. The monitoring camera itself that detects the object may report this alert on the basis of the metadata Dm.

Consequently, when the monitoring system 100 monitors, for example, an intruder, it is possible to reduce misreporting from that in the past and report an alert indicating that the moving body object is detected.

As determination criteria for a valid object adopted by the valid-object determining unit 133, it is also possible to further add a determination criteria based on not only presence or absence of a valid object explained above but also motions of an object, for example, whether the object passes a certain imaginary line or whether the object intrudes into an imaginary area.

In the object detection processing in the past, object detection is performed according to only information concerning a luminance change of an image. Therefore, a background object that causes a large luminance change such as reflected light or a shadow is often misdetected as a moving body object. On the other hand, with the monitoring system 100 that performs the object detection processing explained above, a detected object is accurately detected as a moving body by detecting an occurrence position of the object.

Object detection processing operation in the monitoring system 100 is explained with reference to a flowchart in FIG. 5. In the following explanation, the monitoring camera 1a detects an object. However, since the monitoring cameras 1a, 1b, and 1c have the same configuration, object detection processing is performed in the same processing steps when the monitoring camera 1b or 1c detects an object.

In step S1, the monitoring system 100 starts the object detection processing operation.

In step S2, the client terminal 3 performs mask setting processing on the basis of operation of the user and supplies a mask setting signal to the imaging-operation switching unit 12 of the monitoring camera 1a.

In step S3, the imaging unit 112 of the monitoring camera 1a photographs a monitoring area in frame units such as 30 fps or 15 fps via the lens unit 111 on the basis of control operation of the imaging-operation switching unit 12. The imaging unit 112 supplies the imaging signal Sv in frame units to the imaging-signal processing unit 113. The imaging unit 112 supplies the imaging signal Sv to the imaging-signal processing unit 113. The imaging-signal processing unit 113 applies the various kinds of signal processing explained above to the imaging signal Sv to generate the image data Dv and supplies the image data Dv to the metadata generating unit 13.

In step S3, the imaging-operation switching unit 12 performs mask setting processing for a non-detection area based on the mask setting signal set in step S2. The imaging-operation setting unit 12 supplies data of a set mask (mask data) to the valid-object determining unit 133 included in the metadata generating unit 13.

The mask setting processing is not limited to the setting of a mask based on operation of the user. The client terminal 3 or the monitoring camera 1a may statistically calculate an area in which misdetection frequently occurs and set the area as a mask area.

In step S4, when the image data Dv is supplied from the imaging-signal processing unit 113, the object detecting unit 131 included in the metadata generating unit 13 of the monitoring camera 1a performs processing for detecting a moving body object in this image.

In step S4, the object detecting unit 131 determines whether there is an object. When the object detecting unit 131 determines in step S4 that there is an object, the processing proceeds to step S5. When the object detecting unit 131 determines that there is no object, the processing returns to step S3.

In step S5, the valid-object determining unit 133 determines whether a position of the object detected by the object detecting unit 131 is inside the mask area. When the position of the object is inside the mask area in step S5, the processing proceeds to step S6. When the position of the object is outside the mask area, the processing proceeds to step S7.

In step S6, the object-occurrence-position detecting unit 132 specifies an image frame at a point when the object occurs from the image data Dv of all frames imaged and stored in the storing unit (not shown) and detects an occurrence position of the object in the image. The valid-object determining unit 133 determines whether the occurrence position of the object detected by the object-occurrence-position detecting unit 132 is inside the mask area. When the occurrence position of the object is outside the mask area in step S6, i.e., when the object occurs outside the non-detection area set as the mask, the processing proceeds to step S7. When the occurrence position of the object is inside the mask area, the processing returns to step S3.

In step S7, the valid-metadata generating unit 134 generates the metadata Dm that is information indicating that the moving body object is detected.

In step S8, the client terminal 3 subjects the generated metadata Dm to filter processing to generate alert information. The client terminal 3 performs alert reporting on the basis of the alert information. Alternatively, such filter processing and generation of alert information can also be performed in the monitoring camera 1a. Thereafter, the processing returns to step S3.

As explained above, in the monitoring system 100, if an occurrence position of an object is outside the mask area, the object is determined as a valid object.

Figure 5:
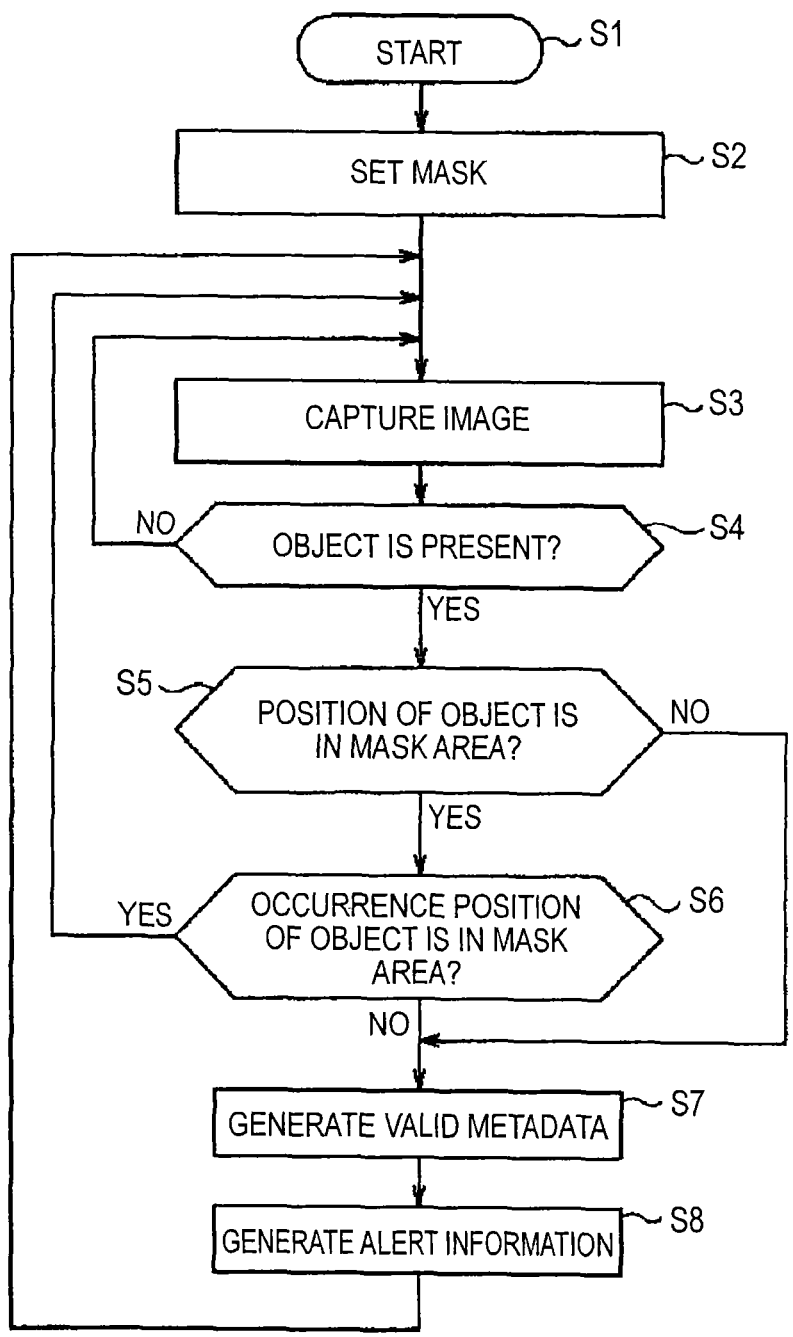
FIG. 5 is a flowchart for explaining object detection processing operation of the monitoring system according to the embodiment.

In the processing steps shown in the flowchart of FIG. 5, while an object that occurs in the mask area is present in the present mask area, the object is determined as an invalid object. Thereafter, tracking of the object is continued. When the object moves out from the mask area while the tracking is performed, the object is determined as a valid object at this point. In this case, at the point when the object is determined as a valid object, it is also possible to trace back image data and recognize that the object is valid from the time of occurrence of the object.

Although not shown in the flowchart of FIG. 5, in the monitoring system 100, even if an occurrence position of an object is inside the mask area, if a present position of the object is outside the mask area, the object is determined as a valid object.

The configuration of the monitoring cameras 1a, 1b, and 1c in the monitoring system 100 according to this embodiment is not limited to the stationary camera explained above and may be, for example, a pan-tilt type camera having a turnable mechanism.

In the stationary camera, an imaging range is typically fixed if once set. In the case of such a stationary camera, a mask is typically set in a fixed area.

On the other hand, when a monitoring camera is the pan-tilt type camera, the monitoring camera can perform imaging in a wide range by turning. Consequently, the user can set a mask in a panoramic image generated by the imaging in the wide range.

An operation example of the pan-tilt type monitoring camera is explained below.

Figure 6:
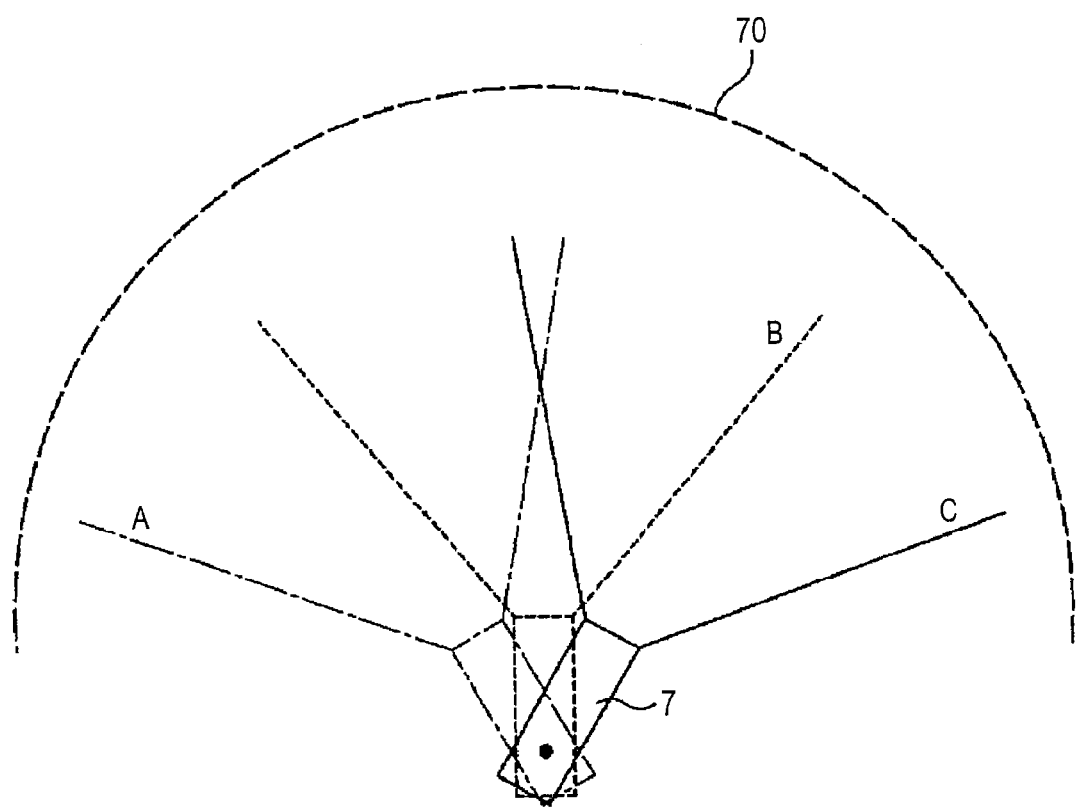
FIG. 6 is a diagram of a state in which a pan-tilt type monitoring camera included in the monitoring system according to the embodiment turns.

As shown in FIG. 6, a pan-tilt type monitoring camera 7 turns to photograph an area surrounded by an imaginary cylindrical surface 70 indicated by an arc. The monitoring camera 7 turns to photograph, for example, images having fields of view indicated by an imaging field of view A, an imaging field of view B, and an imaging field of view C. The monitoring camera 7 causes the storing unit (not shown) to store values of pan and tilt of the monitoring camera 7. The monitoring camera 7 projects, on the basis of the pan and tilt values stored in the storing unit, the photographed images on the imaginary cylindrical surface 70 having a center same as a rotation center of the camera to thereby create one panoramic image on the imaginary cylindrical surface 70. By using the created image, a mask can be set in the same manner as the case in which the monitoring camera is the stationary camera. Although the images are projected on the imaginary cylindrical surface 70, it is also possible to project the images on a spherical surface or project the images on an expanded plane such as the Mercator map.

When the monitoring camera 7 may be unable to store a tilt value, it is also possible to extract feature values of images photographed in an area A, an area B, and an area C with, for example, edge extraction or corner extraction to perform matching processing for feature points and create one panoramic image. This is effective, for example, when the rotation center of the monitoring camera 7 does not coincide with a focus of an image.

In this embodiment, it is also possible to use a method of, for example, extracting, in a slit shape, a part of images photographed by rotating the monitoring camera 7 and rearranging the extracted images according to the rotation of the monitoring camera 7.

In this embodiment, a zoom-type monitoring camera can be used. In the zoom-type monitoring camera, for example, it is possible to set a mask on the basis of images photographed at wide ends via a lens.

Figure 7:
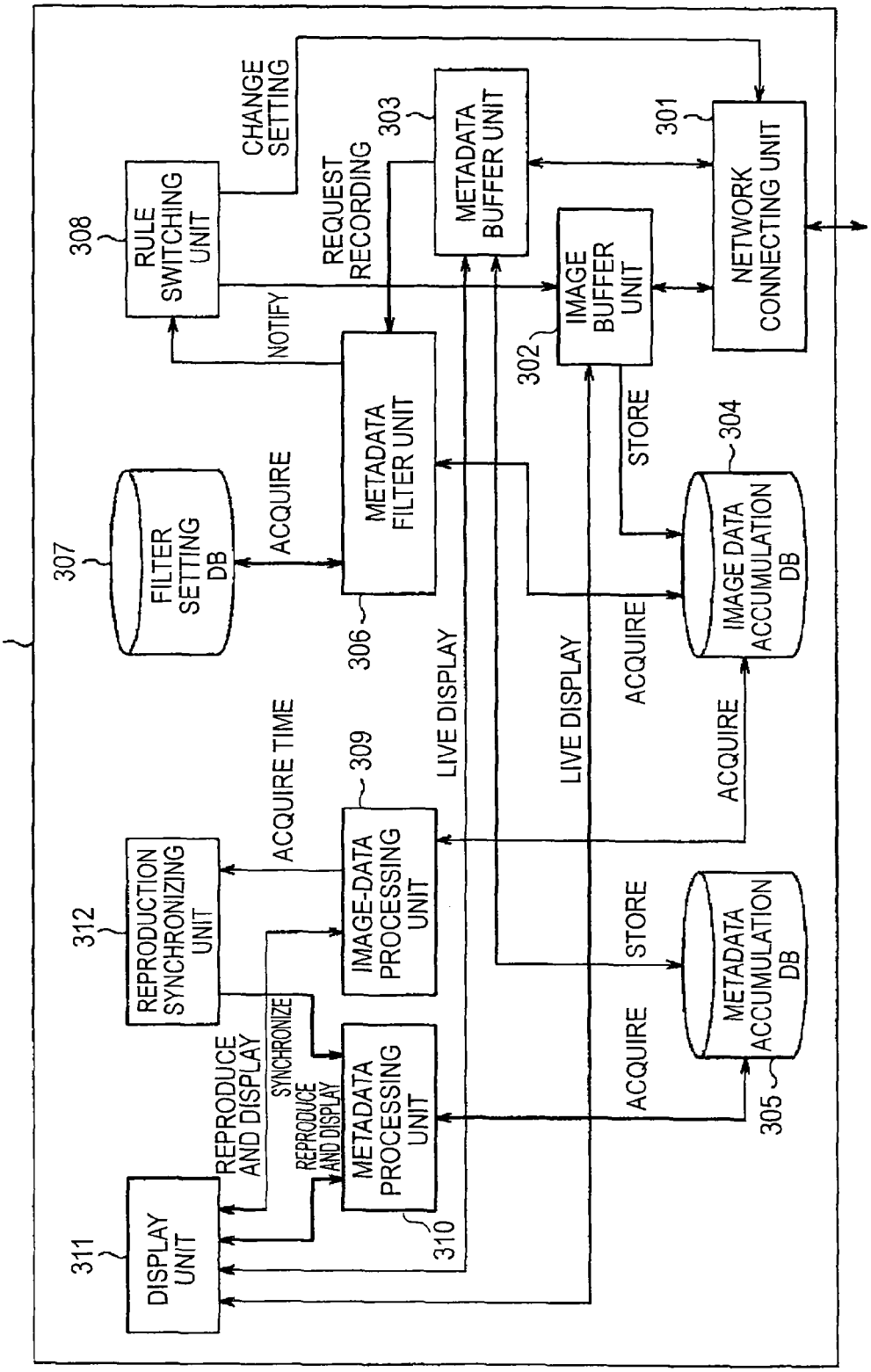
FIG. 7 is a functional block diagram of a detailed configuration of a client terminal.

A detailed configuration of the client terminal 3 shown in FIG. 1 is explained with reference to a functional block diagram of FIG. 7. Respective functional blocks of the client terminal 3 may be configured by hardware or may be configured by software.

The client terminal 3 includes a network connecting unit 301 that performs data transmission with the monitoring cameras 1a, 1b, and 1c, an image buffer unit 302 that acquires image data from the monitoring cameras 1a, 1b, and 1c, a metadata buffer unit 303 that acquires metadata from the monitoring cameras 1a, 1b, and 1c, a filter setting database (DB) 307 that accumulates filter setting corresponding to filter processing, a metadata filter unit 306 as a filter unit that performs filter processing for the metadata, a rule switching unit 308 that notifies the monitoring cameras 1a, 1b, and 1c of a setting change, an image data accumulation database 304 that accumulates the image data, a metadata accumulation database 305 that accumulates the metadata, a display unit 311 that displays the image data, the metadata, and the like, an image-data processing unit 309 that performs processing for causing the display unit 311 to reproduce the image data, a metadata processing unit 310 that performs processing for causing the display unit 311 to reproduce the metadata, and a reproduction synchronizing unit 312 that synchronizes reproduction of the metadata and reproduction of the image data.

The image buffer unit 302 acquires the image data Dt from the monitoring cameras 1a, 1b, and 1c and performs decoding processing for the encoded image data Dt. The image buffer unit 302 stores the acquired image data Dt in a not-shown buffer provided in the image buffer unit 302. The image buffer unit 302 also performs processing for sequentially supplying the image data stored in the not-shown buffer to the display unit 311 that displays an image. By storing the image data in the not-shown buffer in this way, it is possible to sequentially supply the image data to the display unit 311 regardless of reception timing of the image data transmitted from the monitoring cameras 1a, 1b, and 1c. The image buffer unit 302 causes, on the basis of a recording request signal supplied from the rule switching unit 308 explained later, the imaged data accumulation database 304 to accumulate the stored image data. It is also possible to cause the image data accumulation database 304 to accumulate encoded image data and decode the image data in the image-data processing unit 309 explained later.

The metadata buffer unit 303 stores the metadata Dm acquired from the monitoring cameras 1a, 1b, and 1c in a not-shown buffer provided in the metadata buffer unit 303. The metadata buffer unit 303 also performs processing for supplying the stored metadata Dm to the metadata filter unit 306 explained later. Since the not-shown buffer stores the metadata, it is possible to sequentially supply the metadata to the display unit 311 regardless of reception timing of the metadata Dm from the monitoring cameras 1a, 1b, and 1c.

When the metadata buffer unit 303 accumulates the metadata Dm acquired from the monitoring cameras 1a, 1b, and 1c in the metadata accumulation database 305, the metadata buffer unit 303 adds time information of image data that synchronizes with the metadata. This makes it possible to read out the metadata Dm at desired time from the metadata accumulation database 305 using the added time information without discriminating time when content of the metadata Dm is read out.

The filter setting database 307 accumulates filter setting corresponding to filter processing performed in the metadata filter unit 306 explained later and supplies the filter setting to the metadata filter unit 306. The filter setting is setting for indicating, for each kind of information concerning a monitoring target included in metadata, for example, determination criteria for determining whether it is necessary to perform output of alert information or the like and switching of the imaging operation of the monitoring cameras 1a, 1b, and 1c. By performing filter processing for the metadata using the filter setting, it is possible to indicate a filter processing result for each kind of information concerning an object. Depending on the filter processing result, it may be necessary to perform output of alert information or it may be necessary to switch the imaging operation of the monitoring cameras 1a, 1b, and 1c.

The metadata filter unit 306 performs the filter processing for the metadata using the filter setting accumulated in the filter setting database 307 and determines whether an alert should be reported. The metadata filter unit 306 performs the filter processing for the metadata acquired by the metadata buffer unit 303 and the metadata supplied from the metadata accumulation database 305 and notifies the rule switching unit 308 of a result of the filter processing.

The rule switching unit 308 generates a switching instruction signal on the basis of the filter processing result notified from the metadata filter unit 306 and notifies the monitoring cameras 1a, 1b, and 1c of a change such as switching of an imaging direction. For example, the rule switching unit 308 outputs, on the basis of the filter processing result obtained from the metadata filter unit 306, a command for switching the operation of the monitoring cameras 1a, 1b, and 1c such that a monitoring image suitable for monitoring can be obtained. The rule switching unit 308 supplies a recording request signal to the image data accumulation database 304 on the basis of the filter processing result and causes the image data accumulation database 304 to accumulate the image data acquired by the image buffer unit 302.

The image data accumulation database 304 accumulates the image data acquired by the image buffer unit 302. The metadata accumulation database 305 accumulates the metadata Dm acquired by the metadata buffer unit 303.

The image-data processing unit 309 performs processing for causing the display unit 311 to display the image data accumulated in the image data accumulation database 304. The image-data processing unit 309 sequentially reads out the image data from a reproduction position indicated by the user and supplies the read-out image data to the display unit 311. The image-data processing unit 309 supplies a reproduction position (reproduction time) of image data being reproduced to the reproduction synchronizing unit 312.

The reproduction synchronizing unit 312 that synchronizes the metadata Dm and the image data supplies a synchronization control signal to the metadata processing unit 310 and controls the operation of the metadata processing unit 310 such that the reproduction position supplied from the image-data processing unit 309 and a reproduction position at the time when the metadata processing unit 310 reproduces the metadata accumulated in the metadata accumulation database 305 synchronize with each other.

The metadata processing unit 310 performs processing for causing the display unit 311 to display the metadata Dm accumulated in the metadata accumulation database 305. The metadata processing unit 310 sequentially reads out the metadata Dm from the reproduction position indicated by the user and supplies the read-out metadata Dm to the display unit 311. When both the image data and the metadata Dm are reproduced, as explained above, the metadata processing unit 310 controls the reproduction operation on the basis of the synchronization control signal supplied from the reproduction synchronizing unit 312 and outputs the metadata Dm that synchronizes with the image data to the display unit 311.

The display unit 311 displays the live image data supplied from the image buffer unit 302, the reproduced image data supplied from the image-data processing unit 309, the live metadata Dm supplied from the metadata buffer unit 303, and the reproduced metadata supplied from the metadata processing unit 310. The display unit 311 displays (outputs), on the basis of the filter setting from the metadata filter unit 306, an image indicating a monitoring result based on the filter processing result using any one of a monitoring image, an image of the metadata, and an image of the filter setting or an image formed by combining these images.

The display unit 311 functions as a graphical user interface (GUI). The user can define a filter and GUI-display, for example, an analysis result of information concerning the processing units and alert information by selecting a filter setting menu and the like displayed on the display unit 311 using a not-shown operation key, mouse, remote controller, or the like.

With the monitoring system 100 according to this embodiment, it is possible to accurately detect a moving body object in the outdoors where an environmental change tends to occur.

In the outdoors, reflected light and a shadow are caused in background objects such as a sign, a signboard, and a curbstone by the sunlight, light of a car, and the like all day and all night. In the moving body detection processing in the past, a stationary mask is mainly set. The user sets a large number of stationary masks in the background objects in order to prevent misdetection of an object. Therefore, a moving body object that should originally be detected may not be able to be detected and misreporting of an alert, which is a serious problem in a monitoring system, often occurs. On the other hand, with the monitoring system 100 according to this embodiment, it is possible to reduce the misreporting of an alert by performing the detection processing for an object occurrence position explained above.

The present invention is not limited to only the embodiment explained above. It goes without saying that various modifications are possible without departing from the spirit of the present invention.

Figure 8:
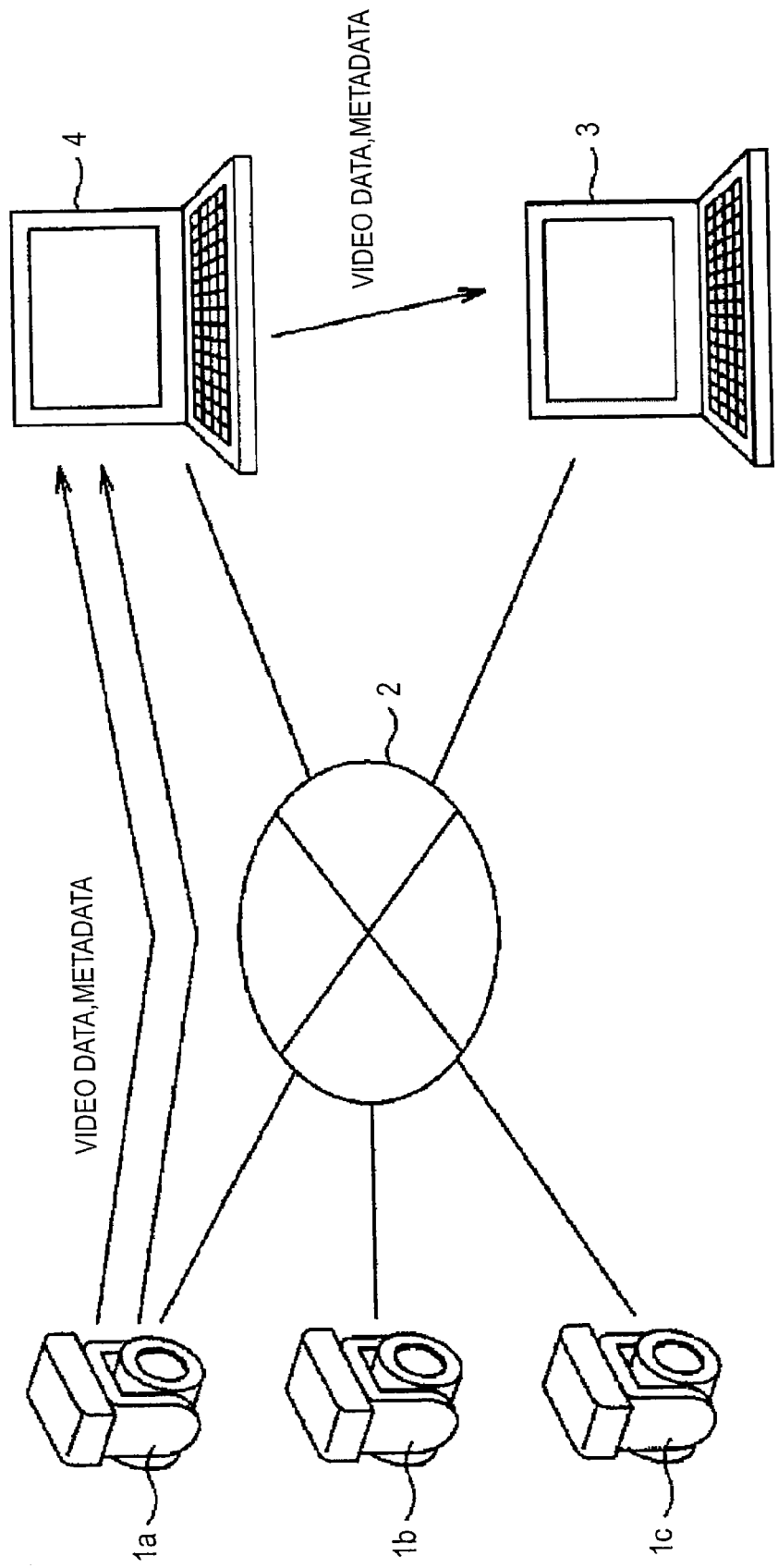
FIG. 8 is a diagram of another configuration example of the monitoring system according to the embodiment.
Figure 9:
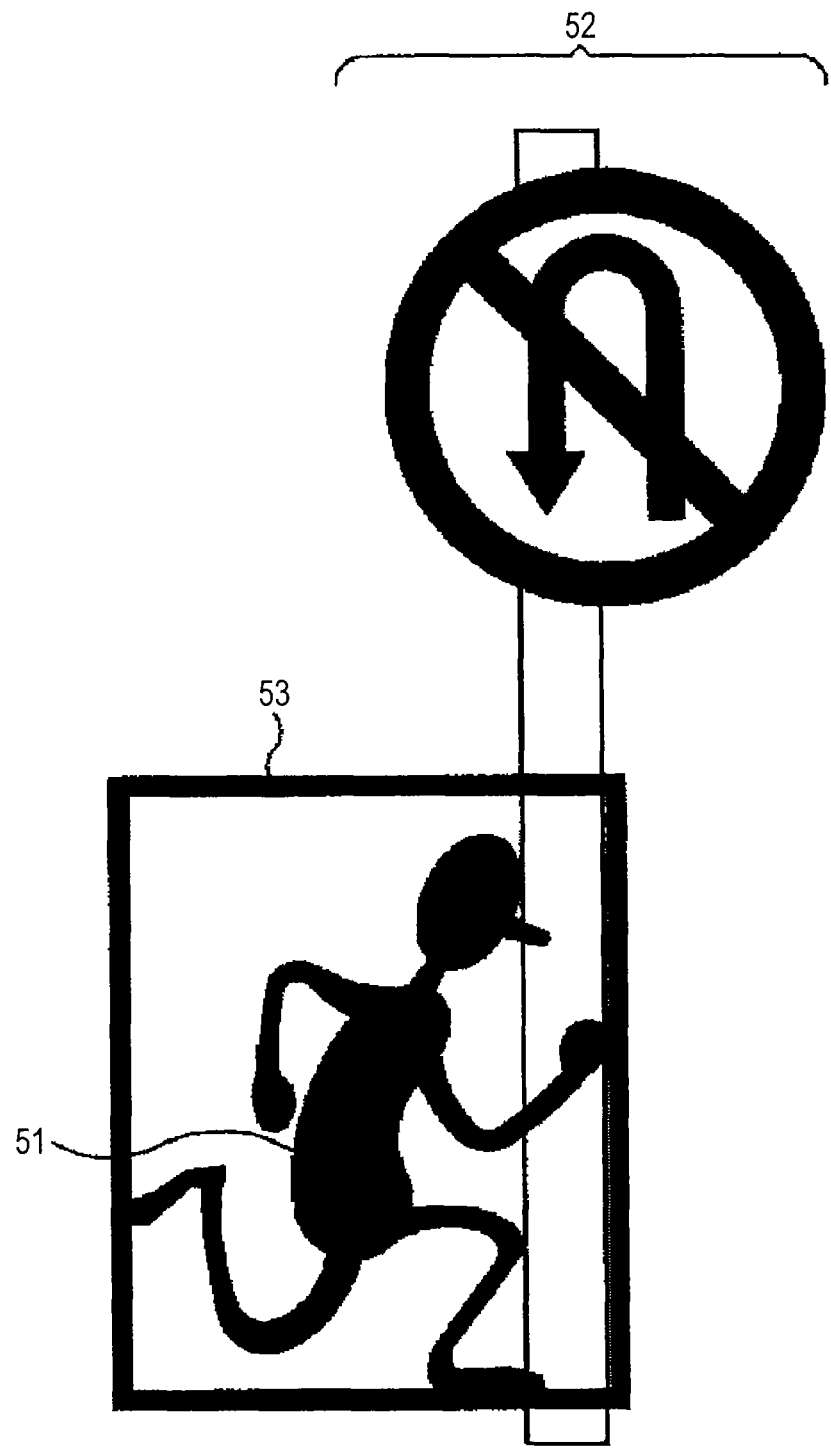
FIG. 9 is a diagram of a state of moving body detection in a monitoring system in the past.
Figure 10:
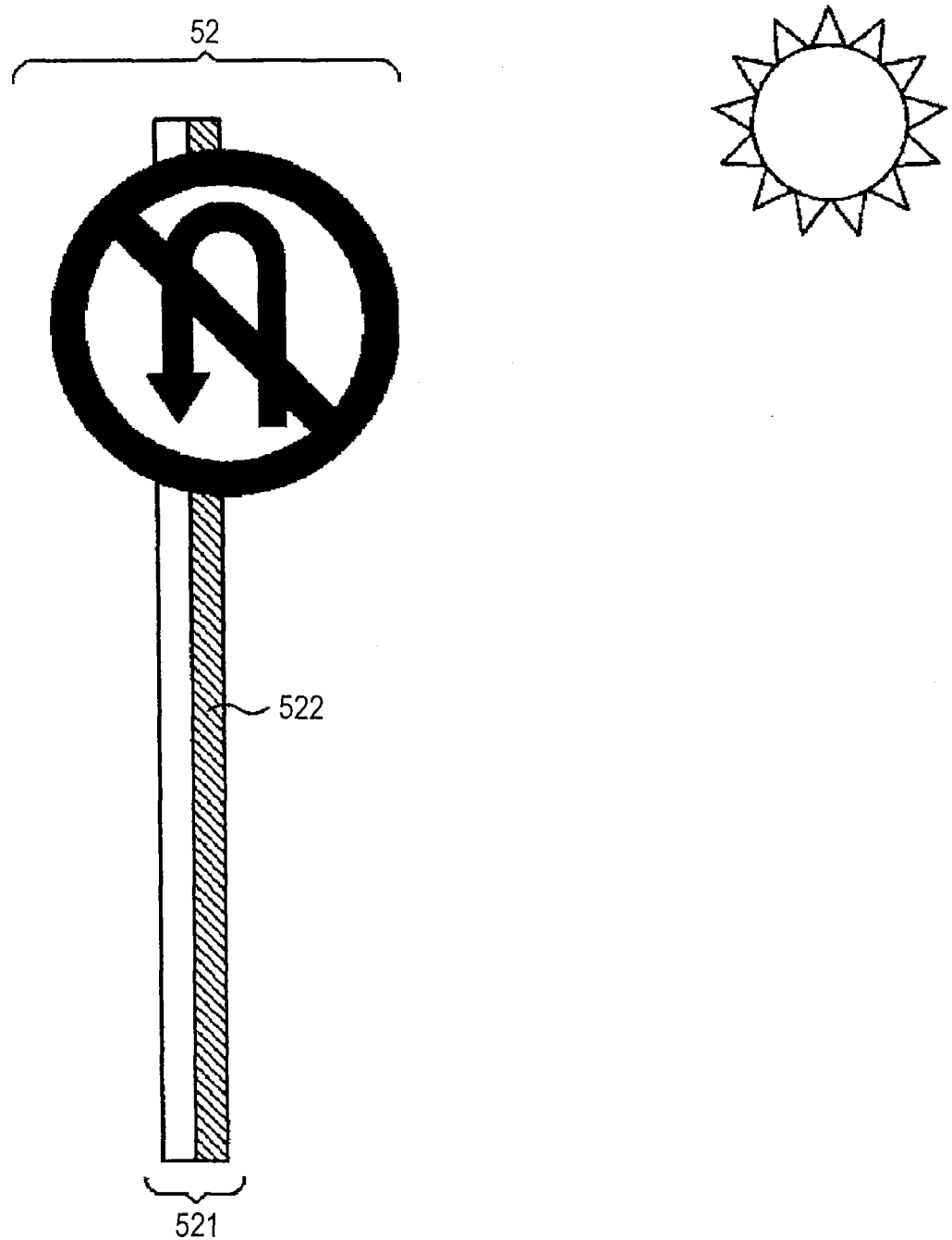
FIG. 10 is a diagram of a state in which the sunlight is reflected on an area in a part on the surface of a pole of a sign, on which the sunlight is irradiated, and causes a large luminance change.
Figure 11:
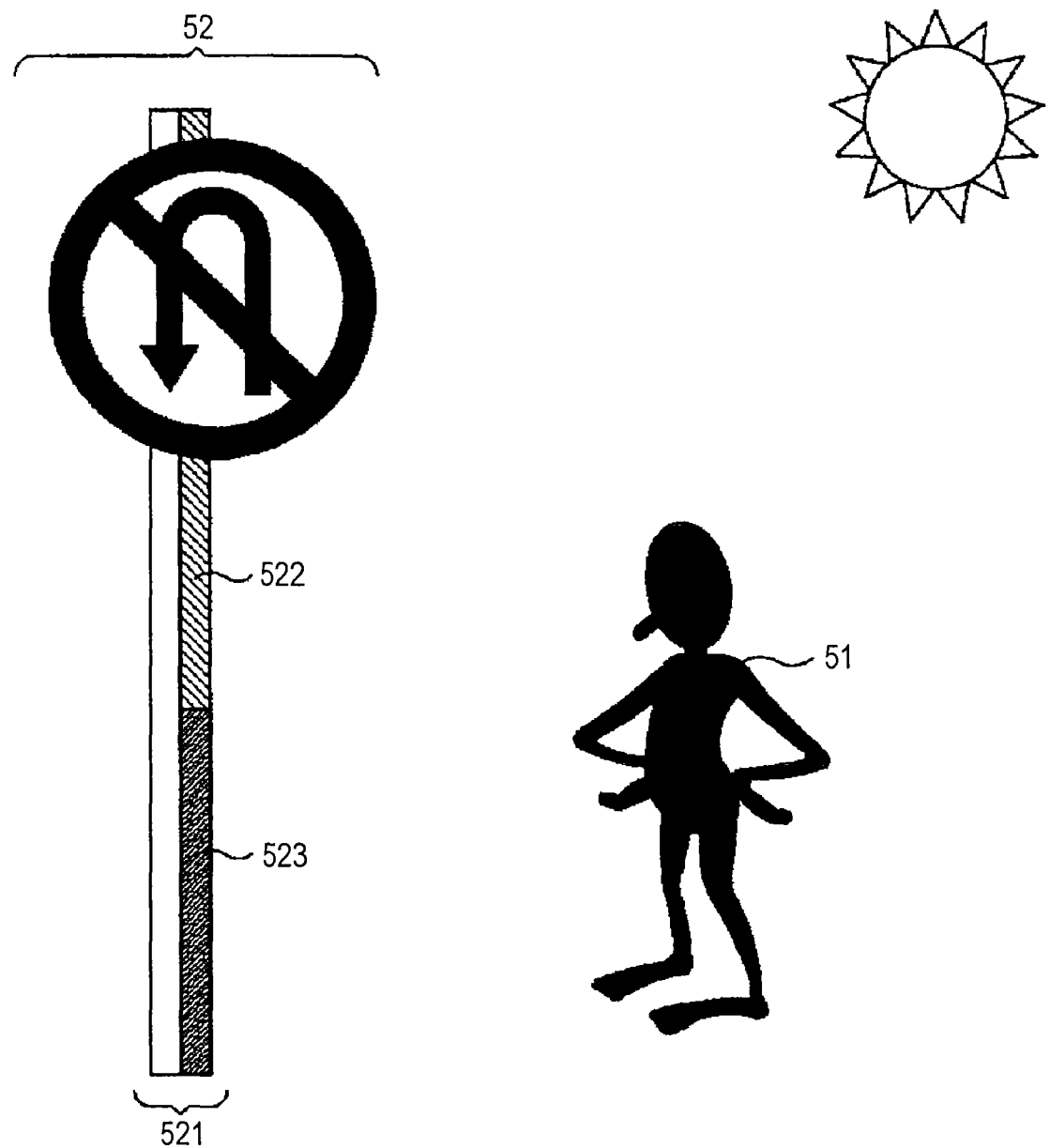
FIG. 11 is a diagram of a state in which a person as an object passes a sunlight-irradiated side of a background object.
Figure 13:
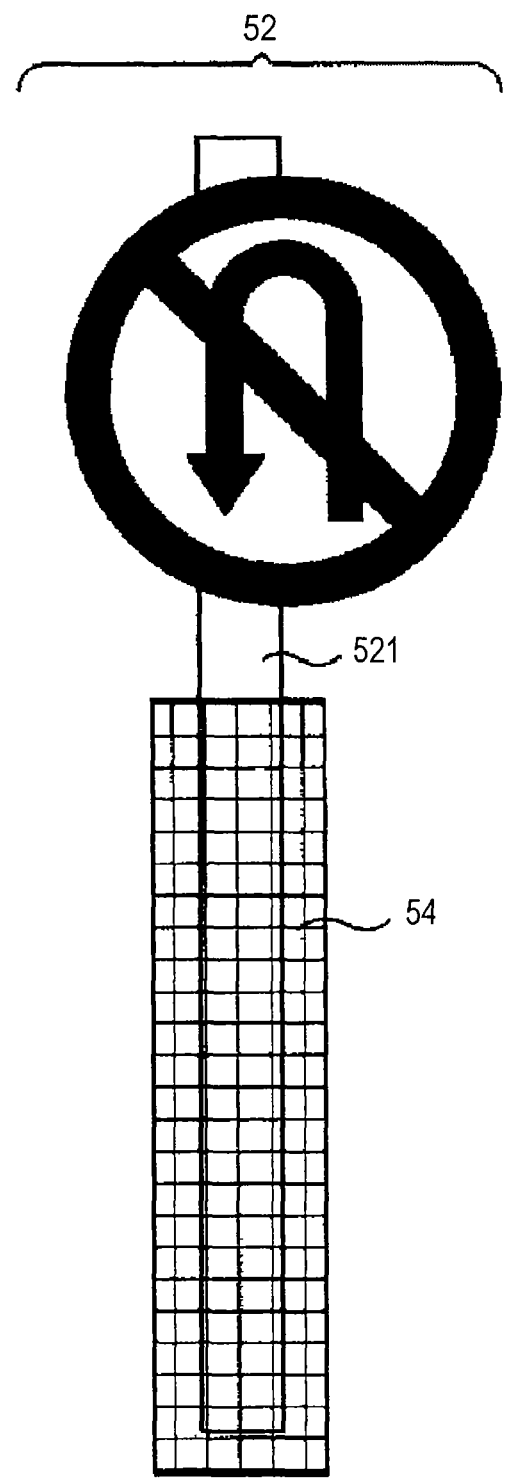
FIG. 13 is a diagram for explaining mask setting processing in the monitoring system in the past.
Figure 14:
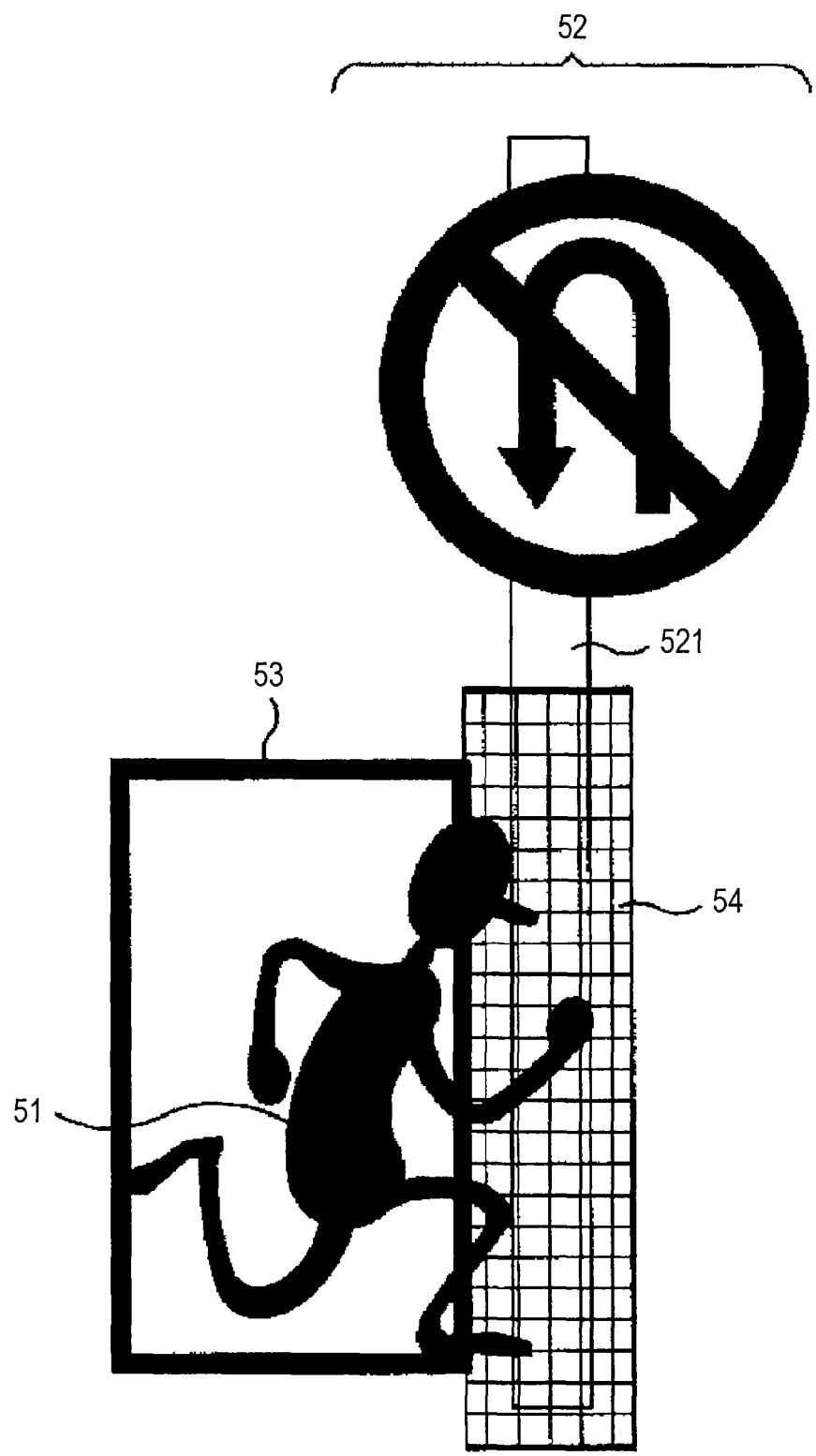
FIG. 14 is a diagram of a state of object detection in the monitoring system in the past.

For example, as shown in FIG. 8, the monitoring system according to this embodiment may further include a server 4 in the configuration of the monitoring system 1 to divide a client function. In other words, a monitoring system 200 according to this embodiment includes the server 4 as shown in FIG. 8 and can obtain functions and effects same as those in the example shown in FIG. 1. In the monitoring system 200 shown in FIG. 8, the server 4 has a configuration same as that of the client terminal 3, acquires, via the network 2, data output from the monitoring cameras 1a, 1b, and 1c, and supplies the data to the client terminal 3. With such a monitoring system 200, by dividing a server function and a client function, it is possible to properly use the server 4 and the client terminal 3, for example, to process a large amount of data in the server 4 having high processing performance and solely view a processing result in the client terminal 3 having low processing performance. In this way, the monitoring system 200 can be configured as a monitoring system more abundant in flexibility by distributing the functions via the server.

It goes without saying that the numbers and configurations of monitoring cameras, client terminals, and servers included in the monitoring system according to this embodiment are not limited to the examples explained above.

In the explanation of the embodiment, the monitoring cameras 1a, 1b, and 1c transmits the metadata Dm to the client terminal 3 or the server 4 and the client terminal 3 or the server 4 generates the alert information on the basis of the metadata Dm. However, the present invention is not limited to this. The monitoring cameras 1a, 1b, and 1c may include metadata processing units and generate and output alert information.

It should be understood by those skilled in the art that various modifications, combinations, sub-combinations and alterations may occur depending on design requirements and other factors insofar as they are within the scope of the appended claims or the equivalents thereof.

What is claim is:

1. An image processing apparatus comprising:
    an object detecting unit implemented by one or more microprocessors that detects a candidate object from image data of an image of a predetermined area;
    a storing unit that stores information of a mask area; and
    a valid-object determining unit implemented by the one or more microprocessors that determines whether the candidate object detected by the object detecting unit is a true detected object and/or whether the candidate object detected by the object detecting unit is a false detected object, the determination based on at least one of a relationship between a current position of the object and the mask area and a relationship between a past position of the object and the mask area.

2. The image processing apparatus according to claim 1, further comprising:
    a valid-metadata generating unit, implemented by the one or more microprocessors, that generates, when the valid-object determining unit determines that the object is the valid object, metadata indicating that the object is detected.

3. The image processing apparatus according to claim 1, further comprising:
    an imaging device that photographs the predetermined area and generates an imaging signal; and
    an imaging-signal processing unit, implemented by the one or more microprocessors, that applies predetermined image processing to the imaging signal generated by the imaging device and generates the image data.

4. The image processing apparatus according to claim 3, wherein the imaging device generates the imaging signal for each frame.

5. An image processing method comprising:
    detecting a candidate object from image data of an image of a predetermined area;
    storing information of a mask area; and
    determining, using one or more microprocessors, whether the candidate object detected by the detecting is a true detected object and/or whether the candidate object detected by the object detecting unit is a false detected object, the determination based on at least one of a relationship between a current position of the object and the mask area and a relationship between a past position of the object the mask area.

6. The image processing method according to claim 5, further comprising:
    generating, using the one or more microprocessors and when the valid-object determining unit determines that the object is the valid object, metadata indicating that the object is detected.

7. The image processing method according to claim 5, further comprising:
    photographing, using an imaging device, the predetermined area and generating an imaging signal; and
    applying, using the one or more microprocessors, predetermined image processing to the imaging signal generated using the imaging device and generating the image data.

8. The image processing method according to claim 7, further comprising generating, using the imaging device, the imaging signal for each frame.

9. An image processing system comprising:
    one or more cameras;
    an object detecting unit implemented by one or more microprocessors that detects a candidate object from image data of an image of a predetermined area, the image data being obtained by the one or more cameras;
    a storing unit that stores information of a mask area;
    a valid-object determining unit implemented by the one or more microprocessors that determines whether the candidate object detected by the object detecting unit is a true detected object and/or whether the candidate object detected by the object detecting unit is a false detected object, the determination based on at least one of a relationship between a current position of the object and the mask area and a relationship between a past position of the object and the mask area; and
    a display unit that displays the image obtained by the one or more cameras.

10. The image processing system according to claim 9, further comprising:
    a valid-metadata generating unit, implemented by the one or more microprocessors, that generates, when the valid-object determining unit determines that the object is the valid object, metadata indicating that the object is detected.

11. The image processing system according to claim 9, further comprising:
    an imaging device that photographs the predetermined area and generates an imaging signal; and
    an imaging-signal processing unit, implemented by the one or more microprocessors, that applies predetermined image processing to the imaging signal generated by the imaging device and generates the image data.

12. The image processing system according to claim 11, wherein the imaging device generates the imaging signal for each frame.

13. The image processing apparatus according to claim 1, wherein the determination is based on both a relationship between a current position of the object and the mask area and a relationship between a past position of the object and the mask area.

14. The image processing apparatus according to claim 1, wherein
the image processing apparatus is connected to a network, and
the image data is transmitted via the network.

15. The image processing apparatus according to claim 1, wherein
the image processing apparatus is used for a monitoring system.

16. The image processing apparatus according to claim 2, wherein
the image processing apparatus generates alert information based on the generated metadata.

17. The image processing method according to claim 5, wherein the image processing method is implemented by an image processing apparatus and the image processing apparatus is connected to a network, further comprising:
transmitting the image data via the network.

18. The image processing method according to claim 5, wherein the image processing method is implemented by an image processing apparatus, and
the image processing apparatus is used for a monitoring system.

19. The image processing method according to claim 6, further comprising:
generating alert information based on the generated metadata.

* * * * *